United States Patent [19]

Seki et al.

[11] 4,247,252
[45] Jan. 27, 1981

[54] VERTICAL AXIS WIND TURBINE

[75] Inventors: Kazuichi Seki, Ishehara; Yoshio Shimizu, Sagamihara; Yoshio Kato, Tokyo, all of Japan

[73] Assignee: Gakko Hojin Tokai University, Tokyo, Japan

[21] Appl. No.: 922,281

[22] Filed: Jul. 6, 1978

[30] Foreign Application Priority Data

Jul. 7, 1977 [JP] Japan .................................. 52-81604

[51] Int. Cl.³ .................................................. F03D 7/06
[52] U.S. Cl. ...................................... 416/44; 416/119; 416/197 A; 416/175
[58] Field of Search ............... 416/119, 140 R, 139 A, 416/240 A, 197 A, 169, 227, 32, DIG. 7, 44, 51, 175 A

[56] References Cited

U.S. PATENT DOCUMENTS

| | | | |
|---|---|---|---|
| 175,530 | 3/1876 | Vernor | 416/197 A |
| 1,319,174 | 10/1919 | Ochoa | 416/119 |
| 1,415,645 | 5/1922 | Holterud | 416/197 A |
| 1,609,883 | 12/1926 | Potts | 416/197 A X |
| 1,766,765 | 6/1930 | Savonius | 416/197 A X |
| 2,067,542 | 1/1937 | Penton | 416/197 A X |
| 3,918,839 | 11/1975 | Blackwell et al. | 416/175 A |
| 4,061,926 | 12/1977 | Peed | 416/139 A X |
| 4,082,479 | 4/1978 | Rangi et al. | 416/227 A X |

FOREIGN PATENT DOCUMENTS

| | | | |
|---|---|---|---|
| 860930 | 12/1952 | Fed. Rep. of Germany | 416/119 |
| 892130 | 10/1953 | Fed. Rep. of Germany | 416/197 A |
| 695507 | 12/1930 | France | 416/139 |
| 701036 | 3/1931 | France | 416/139 A |
| 568783 | 4/1945 | United Kingdom | 416/119 |
| 735111 | 8/1955 | United Kingdom | 416/132 B |

*Primary Examiner*—Everette A. Powell, Jr.
*Attorney, Agent, or Firm*—Koda and Androlia

[57] ABSTRACT

Wind turbines are largely divided into vertical axis wind turbines and propeller (horizontal axis) wind turbines. The present invention discloses a vertical axis high speed wind turbine provided with a starting and braking control system. This vertical axis wind turbine is formed by having blades of a proper airfoil fitted to respective supporting arms provided radially from a vertical rotary axis by keeping the blade span-wise direction in parallel with said axis and being provided with a low speed control windmill in which the radial position of each operating piece varies with a centrifugal force produced by the rotation of said vertical rotary axis.

1 Claim, 10 Drawing Figures

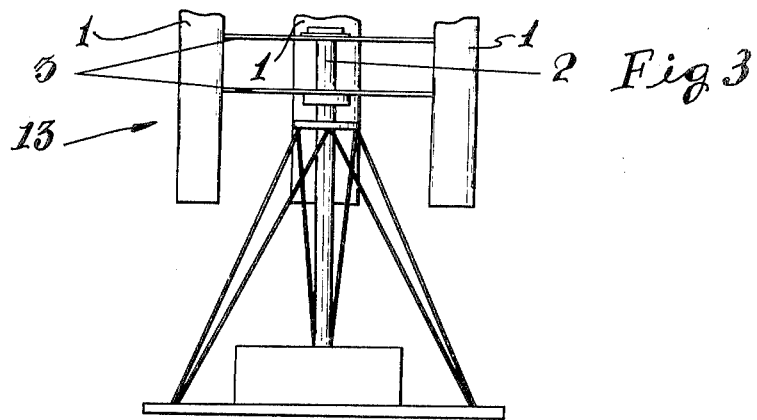
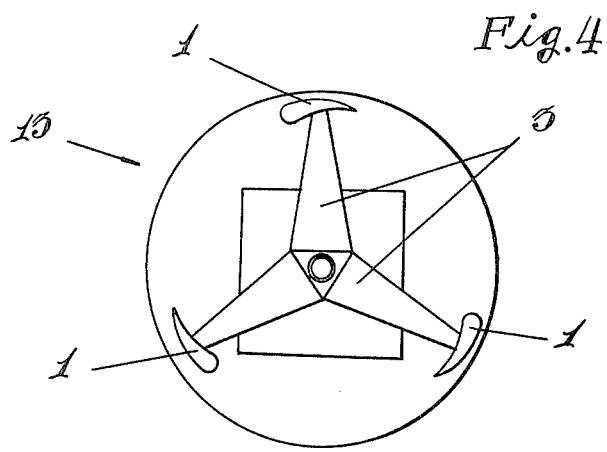
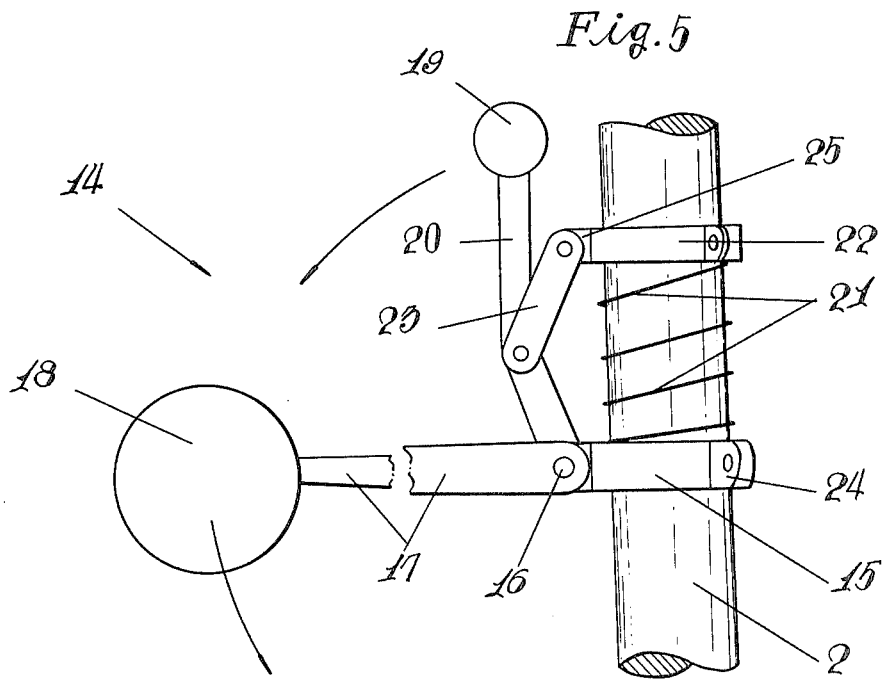

VERTICAL AXIS WIND TURBINE

BACKGROUND OF THE INVENTION

1. Field of the Invention

This invention relates to wind turbines and more particularly to a vertical axis high speed with wind turbine in which starting and/or braking can be controlled.

2. Prior Art

Generally, various wind turbines converting wind energy to a rotatary motion have been already suggested and practiced. Among them, the propeller wind turbine (horizontal axis wind turbine) is required to have the propeller rotating disk always rightly aligned with the wind direction, whereas the vertical axis wind turbine is omni-directional, is not influenced at all by the wind direction and is excellent in respect of the configuration and operation.

Therefore, the present inventors have developed and suggested a vertical axis high speed wind turbine using blades of an efficient airfoil.

In the above mentioned vertical axis high speed wind turbine, the efficiency is high but the starting torque is low. Further, in the general wind turbines, at the time of such excessive wind velocity as in a typhoon, it will be necessary to control the rotational speed. Therefore, in order to practice this kind of vertical axis wind turbine, it is necessary to develop means of achieving the control of the rotational speed of the turbine.

SUMMARY OF THE INVENTION

An object of the present invention is to provide a vertical axis wind turbine wherein, at the time of starting, a starting torque will be obtained.

Another object of the present invention is to provide a vertical axis wind turbine wherein, at the time of such excessive wind velocity as in a typhoon, a braking torque will be obtained.

Still another object of the present invention is to provide a vertical axis wind turbine wherein, at the time of a normal rotation, the reduction of the turbine efficiency due to the presence of the above mentioned control device will be kept minimum.

A further object of the present invention is to provide a vertical axis wind turbine wherein starting and braking can be automatically controlled without using any other power source.

Further objects, features and advantages of the present invention will be better understood through the following description.

BRIEF DESCRIPTION OF THE DRAWINGS

The above mentioned features and objects will become more apparent when taken with the accompanying drawings, wherein like reference numerals denote like element and in which:

FIG. 3 is an elevation of a wind turbine of the embodiment of the present invention.

FIG. 4 is a plan view of FIG. 3.

FIG. 5 is an elevation of an essential part showing the first embodiment of a low speed windmill for the controll of the rotational speed of the turbine.

DETAILED DESCRIPTION OF THE INVENTION

Figure 1:
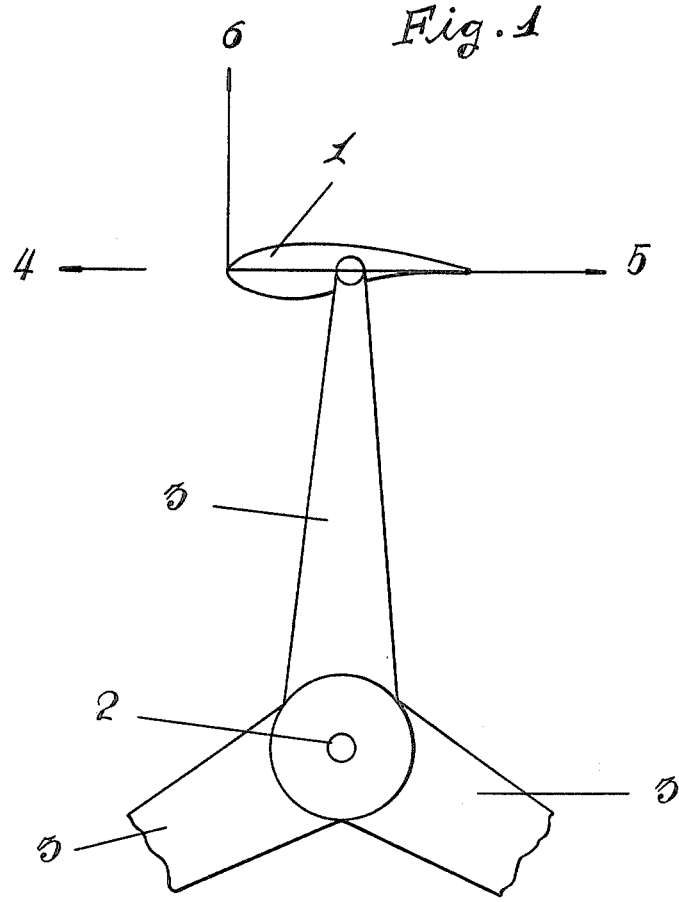
FIG. 1 is an explanatory plan view showing a blade to be used in an embodiment of the present invention as fitted to a vertical axis wind turbine.
Figure 2:
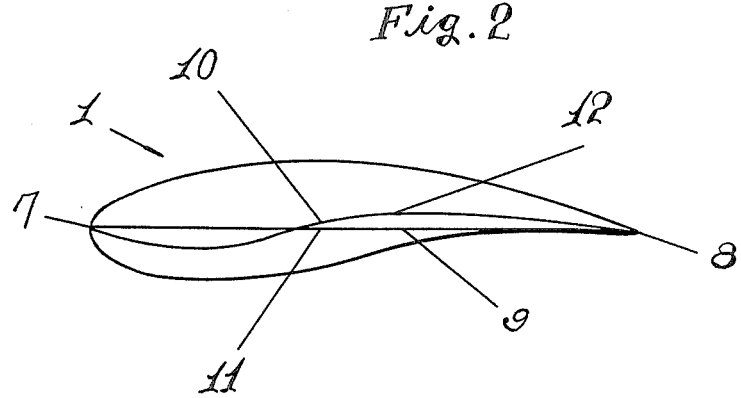
FIG. 2 is an explanatory view showing an embodiment of the airfoil of a blade to be used in the present invention.
Figure 6:
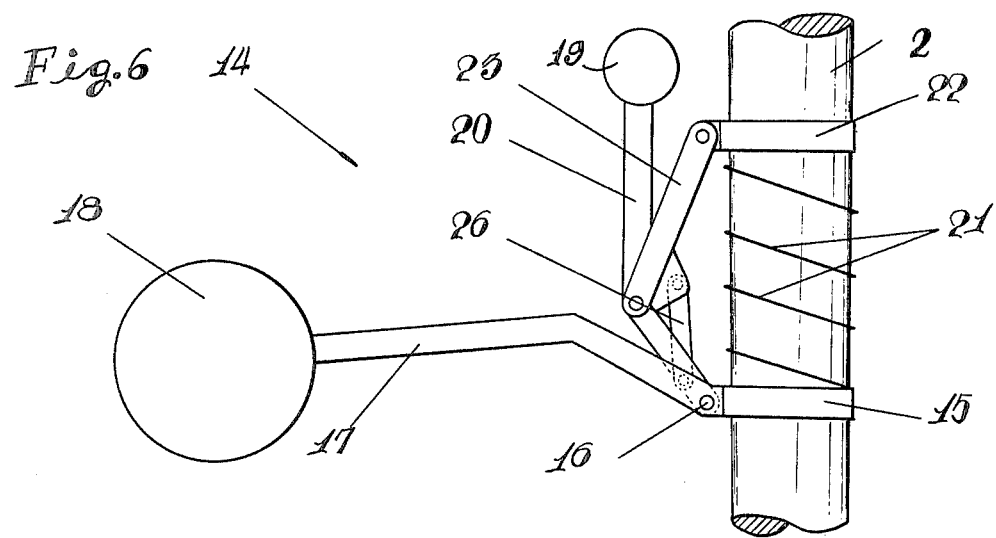
FIGS. 6 to 10 show other embodiments of the low speed windmill for the control of the rotational speed of the turbine, FIG. 6 being an elevation of the essential part at the time of starting, FIG. 7 being one at the time of a normal rotation, FIG. 8 being one at the time of an excessive rotational speed, FIG. 9 being a plan view of a flange part and FIG. 10 being a plan view showing a sliding ring.
Figure 7:
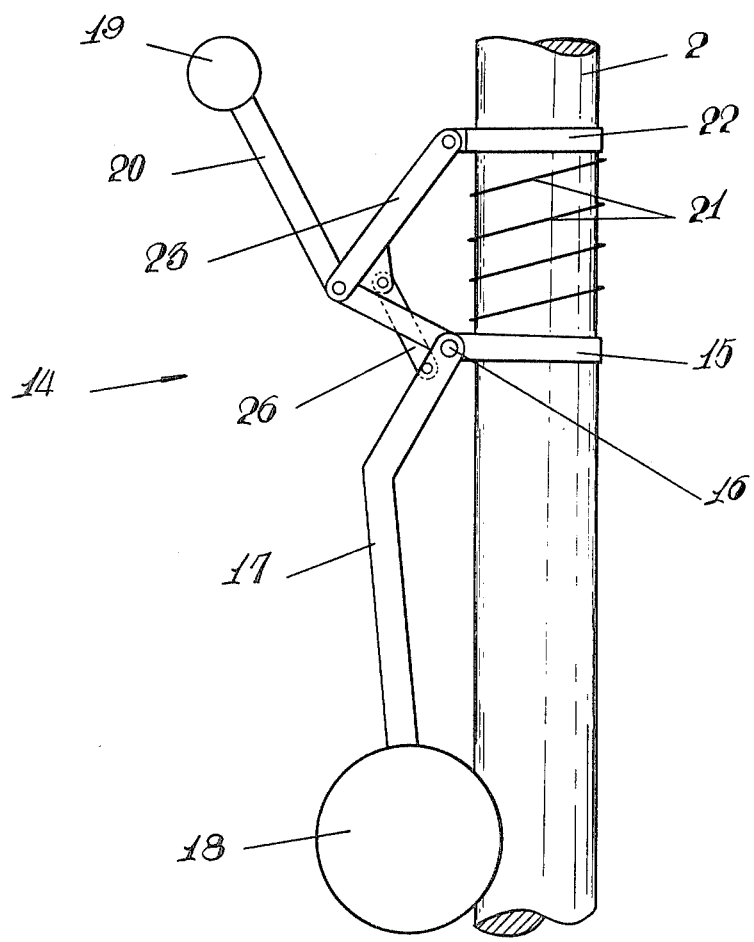
Figure 8:
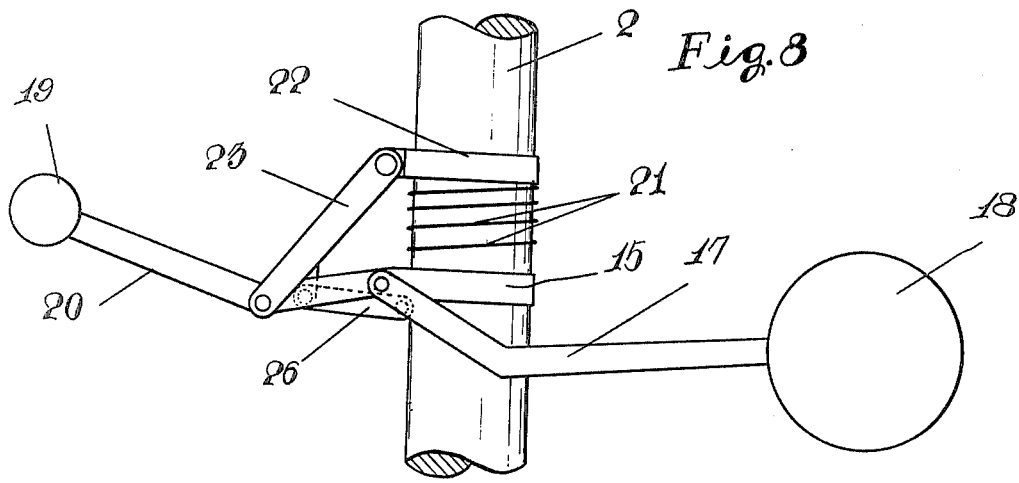
Figure 9:
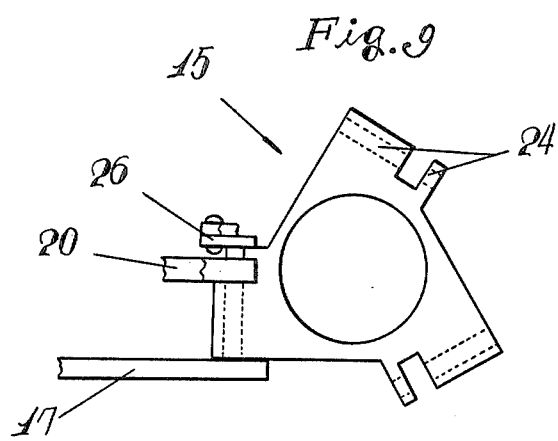
Figure 10:
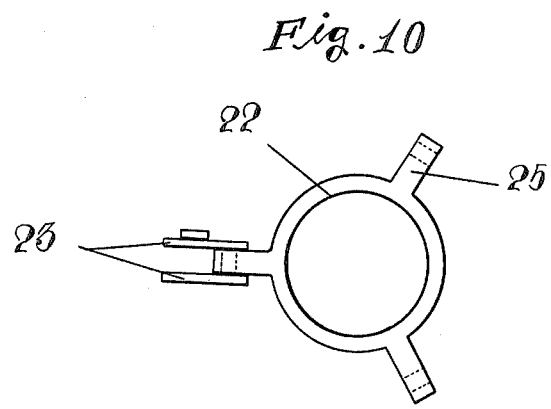

FIGS. 1 and 2 show a blade for wind turbines to be used in an embodiment of the vertical axis high speed wind turbine of the present invention.

This blade 1 is fitted and fixed as shown in FIG. 1 to the ends of supporting arms 3 fitted above and below a vertical rotary shaft 2 and projecting radially therefrom. In FIG. 1, reference numeral 4 indicates an arrow showing the advancing direction of the blade and 5 and 6 indicate arrows showing respectively the positive direction on the coordinate X and the positive direction on the coordinate Y. In FIG. 2 of the airfoil of the blade 1, reference numeral 7 indicates the leading edge of the airfoil, 8 indicates the trailing edge of the airfoil, 9 indicates the chord line of the airfoil, 10 indicates a camber reversing point and 11 indicates a camber reversing position which is a position on the coordinate X of the camber reversing point 10. The above mentioned airfoil 1 is formed by giving a camber of a downward convex curvature between the leading edge 7 of the airfoil and the camber reversing position 11 and a camber of an upward convex curvature between the camber reversing position 11 and the trailing edge 8 of the airfoil so as to be a mean line 12 and giving a rational thickness distribution of this mean line.

The form of the above mentioned airfoil, the blade used in the present invention has three characteristics required of the blade of the vertical axis wind turbine that the pitching moment coefficient should have a large negative value, the minimum drag coefficient should be small and the difference between the zero lift angle and minimum drag coefficient angle should be small.

FIGS. 3 and 4 show a vertical axis wind turbine embodying the present invention. This vertical axis wind turbine 13 is formed by fitting and fixing the above described blades 1 at their upper and lower parts of the midspan position respectively to the ends of the supporting arms 3 provided to project at regular intervals radially from two upper and lower flanges fixed to the vertical rotary shaft 2.

A low speed control windmill 14 is formed by fitting wind cups 18, which are operating pieces, to respective supporting arms 17 rotatable each around a fulcrum 16 as a center and provided to project toward the outer periphery at regular intervals on a flange 15 fitted and fixed to the above mentioned rotary shaft 2. This control windmill 14 has a weight 19 supporting arm 20 pivoted at the lower end to a pivoting point of each supporting arm 17 and the flange 15 and has a rod 23 rotatably pivoted between the intermediate part of said supporting arm 20 and a sliding ring 22 provided to be vertically movable on the rotary shaft 2 and energized upward by a spring 21.

By the way, in the drawing, reference numeral 24 indicates a flange supporting arm fitting part and 25 indicates a rod pivoting part of the sliding ring.

In the above described low speed control windmill 14, at the time of starting the wind turbine 13, the sliding ring 22 will be energized upward by the compressive load of the spring 21 and will pull the weights 19 and supporting arms 20 through the respective rods 23 toward the rotary shaft 2 and therefore the wind cups 18 will be positioned in the direction of the maximum radius as shown in FIG. 5 to obtain a starting torque.

When the wind turbine 13 reaches a normal rotating speed, by the centrifugal force, the weights 19 will be moved toward the outer periphery against the compressive load of the spring 21 and the wind cups 18 will be pushed down to the minimum radius positions so as to prevent the adverse effects on the turbine 13.

FIGS. 6 to 10 show another embodiment of the low speed control windmill 14. In the windmill 14 of this embodiment, a link mechanism 26 is so provided that, when the weight 19 rotates by about 45 degrees, the wind cup 18 may rotate by about 90 degrees and, when the weight 19 rotates by about 90 degrees, the wind cup 18 may rotate by about 180 degrees so that the torque transmitted to the wind cup 18 may be halved.

Therefore, at the time of the excessive rotational speed of the wind turbine 13, due to the movement of the weights 119 by the centrifugal force, the wind cups will come to the maximum radius positions in the reverse direction to obtain an aerodynamic drag force, i.e., a braking torque.

Further, in the present invention, it is preferable that the relation between the position of each blade 1 of the wind turbine and the position of each wind cup 18 of the control windmill is such that the starting torque of the control windmill 14 may be maximum in the position in which the starting torque of the wind turbine 13 is minimum. It is also preferable that the weight is made in such form having a small drag coefficient as, for example, of a water drop.

By the way, in the vertical axis wind turbine of the present invention, the number of the blades arranged in parallel with the vertical rotary axis is not limited to be three as in the embodiment but any rational number of blades may be preferably fitted depending on the local and meteorological conditions under which the wind turbine is to be used. This is the same also with the number of the wind cups of the low speed control windmill.

Also, in the vertical axis wind turbine of the present invention, the positions and number of the supporting arms for fitting the blades to the rotary shaft are not limited to those in the above mentioned embodiments.

Further, in the low speed control windmill, the kind and structure of the mechanism of moving the operating pieces with the centrifugal force are not limited.

As it is obvious that different working manners can be formed in a wide range without deviating from the spirit and scope of the present invention, this invention is not limited to the specific working manners except as defined in the appended claims.

We claim:

1. A vertical axis wind turbine comprising:
   a plurality of main turbine vanes rotatably coupled to a shaft of the turbine; and
   a low speed control turbine rotatably coupled to said shaft of said turbine, said low speed control turbine comprising:
      at least one wind cup pivotally coupled to said shaft, said wind cup being pivotally coupled to said shaft for pivotal movement at least from a first maximally radially extending position to a minimally radially extending position and to a second maximally radially extending position wherein said wind cup faces in a direction opposite to a direction of rotation of said wind turbine; and
   a means for pivotally moving said wind cup from at least said minimally to said first and second maximally radially extending positions in respone to a rotary speed of said wind turbine such that said wind cup is in said maximally extending position when said rotary speed is zero, said minimally extending position when said rotary speed is equal to normal rotary speed of said wind turbine whereby a starting torque of said wind turbine is increased while adverse effects on said wind turbine by said low speed control turbine are prevented when said wind turbine achieves said normal rotary speed and in said second maximally radially extending position when said rotary speed exceeds said normal rotary speed whereby a braking torque is applied to said wind turbine when said rotary speed exceeds said normal rotary speed.

* * * * *